United States Patent
Petrovic et al.

(10) Patent No.: US 9,222,687 B2
(45) Date of Patent: Dec. 29, 2015

(54) ACTIVE CHILLED BEAM WITH STERILIZATION MEANS

(71) Applicants: Vladimir M. Petrovic, Longmeadow, MA (US); Daniel Harris, Westfield, MA (US); Rainy Shukla, Charlottesville, VA (US)

(72) Inventors: Vladimir M. Petrovic, Longmeadow, MA (US); Daniel Harris, Westfield, MA (US); Rainy Shukla, Charlottesville, VA (US)

(73) Assignee: Mestek, Inc., Westfield, MA (US)

( * ) Notice: Subject to any disclaimer, the term of this patent is extended or adjusted under 35 U.S.C. 154(b) by 196 days.

(21) Appl. No.: 13/757,966

(22) Filed: Feb. 4, 2013

(65) Prior Publication Data

US 2013/0213061 A1 Aug. 22, 2013

Related U.S. Application Data

(60) Provisional application No. 61/594,528, filed on Feb. 3, 2012, provisional application No. 61/639,169, filed on Apr. 27, 2012.

(51) Int. Cl.
*F24F 3/16* (2006.01)
*F24F 1/00* (2011.01)

(52) U.S. Cl.
CPC .............. *F24F 3/16* (2013.01); *F24F 1/0007* (2013.01); *F24F 2001/0037* (2013.01); *F24F 2003/1667* (2013.01)

(58) Field of Classification Search
CPC ... F24F 3/16; F24F 1/0007; F24F 2003/1667; F24F 2001/0037

USPC .............. 62/78, 264, 186, 414, 419, 314; 454/196, 200, 187; 422/186.13, 186.3, 422/186

See application file for complete search history.

(56) References Cited

U.S. PATENT DOCUMENTS

| | | | | |
|---|---|---|---|---|
| 4,604,680 | A * | 8/1986 | Levin et al. | 362/293 |
| 5,987,908 | A * | 11/1999 | Wetzel | 62/259.1 |
| 6,328,937 | B1 * | 12/2001 | Glazman | 422/186.3 |
| 7,073,781 | B2 * | 7/2006 | Mulvaney | 261/37 |
| 7,652,265 | B2 * | 1/2010 | Subbarao et al. | 250/437 |
| 7,802,443 | B2 * | 9/2010 | Wetzel | 62/262 |
| 8,206,475 | B2 * | 6/2012 | Walkinshaw | 55/385.2 |
| 2004/0147214 | A1 * | 7/2004 | Oono | 454/187 |
| 2006/0021375 | A1 * | 2/2006 | Wetzel et al. | 62/419 |
| 2006/0204408 | A1 * | 9/2006 | Son | 422/177 |
| 2008/0072758 | A1 * | 3/2008 | Dobashi | 96/22 |
| 2009/0311951 | A1 * | 12/2009 | Walkinshaw | 451/261 |
| 2010/0212335 | A1 * | 8/2010 | Lukitobudi | 62/93 |
| 2011/0179951 | A1 * | 7/2011 | Suzuki et al. | 96/18 |
| 2012/0071081 | A1 * | 3/2012 | Park et al. | 454/252 |

* cited by examiner

*Primary Examiner* — Mohammad M Ali
(74) *Attorney, Agent, or Firm* — Grogan, Tuccillo & Vanderleeden, LLP

(57) ABSTRACT

An air-handling unit includes a primary air plenum and a primary air inlet in fluid communication with the primary air plenum. The primary air inlet is configured to provide a flow of primary air to the primary air plenum. The air-handling unit also includes a chamber in fluid communication with the primary air plenum. The chamber includes an irradiate cavity and a secondary air inlet configured to accept a flow of secondary air into the irradiate cavity, and a sterilization mechanism positioned in the irradiate cavity. The sterilization mechanism is configured to effectively treat and sterilize the secondary air.

14 Claims, 2 Drawing Sheets

ACTIVE CHILLED BEAM WITH STERILIZATION MEANS

CROSS-REFERENCE TO RELATED APPLICATIONS

This application claims the benefit of U.S. Provisional Application Ser. No. 61/594,528, filed on Feb. 3, 2012, and U.S. Provisional Application Ser. No. 61/639,169, filed on Apr. 27, 2012, both of which are herein incorporated by reference in their entireties.

FIELD OF THE INVENTION

The present invention relates generally to an induction air handling unit and, more particularly, to an active chilled beam with air sterilization means.

BACKGROUND OF THE INVENTION

Known air-conditioning systems treat predominately outside air that is mixed with a proportion of return or recirculated air from within a building. This conditioned air is then used to meet the heating or cooling load within a particular space, such as a number of rooms on a floor or an open space area on a floor of a building.

A chilled beam is one such type of convection HVAC system designed to heat or cool buildings. Pipes carrying water are passed through a beam; i.e., a heat exchanger, suspended a short distance from the ceiling of a room. As the beam chills the air around it, the air becomes denser and falls to the floor. It is replaced by warmer air moving up from below, causing a constant flow of convection and cooling the room.

An active chilled beam, also know as an induction diffuser, utilizes ducts to push or induce air, such as recirculated or secondary air (also known as induced air), toward the unit. Known active chilled beam systems, however, are not particularly suitable for hospitals and other environments wherein recirculated or secondary air may carry bacteria, germs, and the like.

Accordingly, there is a need for an active chilled beam system that is particularly suited for use in hospital patient rooms, outpatient rooms, nurses' stations, waiting areas, and in any area of a hospital that allows recirculation, among other areas where heating, cooling and/or sterilization of recirculated air is desired.

SUMMARY OF THE INVENTION

It is an object of the present invention to provide an active chilled beam system.

It is another object of the present invention to provide an active chilled beam system having sterilization means.

It is another object of the present invention to provide an active chilled beam system wherein sterilization occurs within a mixing chamber/plenum.

It is another object of the present invention to provide an active chilled beam that utilizes a sterilizing light to sterilize induced/recirculated air.

It is yet another object of the present invention to provide an active chilled beam configured to increase the residence time of induced air within the mixing chamber/plenum.

It is another object of the present invention to provide an active chilled beam that is configured to minimize leakage of sterilizing light.

According to the present invention, an air-handling unit for processing an air stream therethrough is provided. The air-handling unit includes a primary air plenum and a primary air inlet in fluid communication with the primary air plenum. The primary air inlet is configured to provide a flow of primary air to the primary air plenum. The air-handling unit also includes a chamber in fluid communication with the primary air plenum. The chamber includes an irradiate cavity and a secondary air inlet configured to accept a flow of secondary air into the irradiate cavity, and a sterilization mechanism positioned in the irradiate cavity. The sterilization mechanism is configured to effectively treat and sterilize the secondary air.

In an embodiment of the present invention an air handling system is provided. The air handling system includes a primary air plenum configured to receive a flow of primary air and a chamber having an irradiate cavity and an induction channel adjacent to an outer edge of said chamber. The induction channel is in fluid communication with the primary air plenum and an outlet port formed in the chamber and is configured to direct a flow of primary air from the primary air plenum to the outlet port to induce a flow of secondary air into the irradiate cavity. The system also includes a sterilization unit disposed in a lower portion of the irradiate cavity.

According to the present invention, a method of processing a stream of air in an air-handling unit includes initiating a flow of primary air into the air handling unit, inducing a flow of secondary air into a cavity within the unit, and sterilizing the secondary air within the cavity.

These and other objects, features, and advantages of the present invention will become apparent in light of the detailed description of the best mode embodiment thereof, as illustrated in the accompanying drawings.

BRIEF DESCRIPTION OF THE DRAWINGS

The accompanying drawings, which are incorporated in and constitute a part of this specification, illustrate embodiments of the disclosure, and together with a general description of the disclosure given above, and the detailed description of the embodiments given below, serve to explain the principles of the disclosure.

Other features and advantages of the present disclosure will become apparent from the following detailed description, taken in conjunction with the accompanying drawings, which illustrate, by way of example, the principals of the invention.

DETAILED DESCRIPTION OF THE PREFERRED EMBODIMENT

Figure 1:
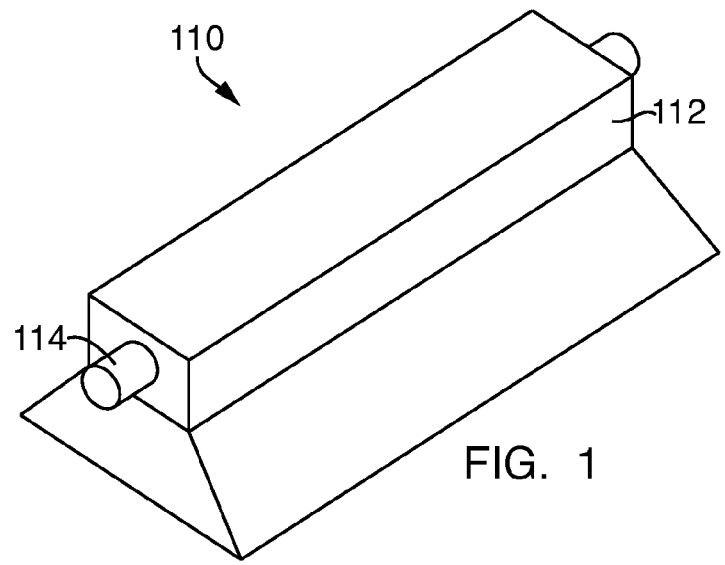
FIG. 1 is a perspective view of an active chilled beam in accordance with an embodiment of the present invention.
Figure 2:
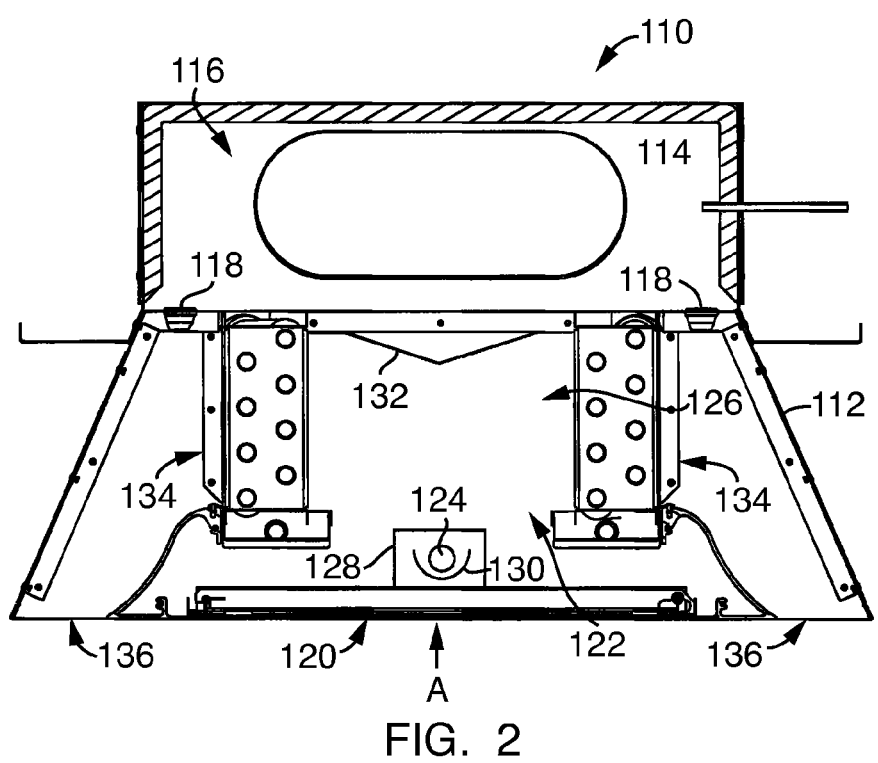
FIG. 2 is a cross-sectional view of the active chilled beam of FIG. 1.

Referring to FIGS. 1 and 2, an active chilled beam 110 according to an embodiment of the present invention is shown. As shown therein, the active chilled beam 110 generally takes the form of a chamber 112 having a primary air inlet 114. The chamber 112 is generally of a sheet metal construction and is provided with flanges for mounting the chilled beam 110 to a ceiling or other support structure. Alternatively, the chamber 112 may be constructed from other materials such as sandwich-foam sheets or fiber reinforced plastics.

With specific reference to FIG. 2, primary/ventilation air from a central air handling system (not shown for clarity) is supplied through the primary air inlet 114 to a primary air plenum 116 in the chamber 112. The primary air within the air plenum 116 is pressurized as compared to a secondary/recirculated air from the room. As a result, the pressurized primary air from the primary air plenum 116 is directed downward through rows of induction nozzles 118 and towards the outer edges of the chamber 112, before exiting out into the space below the unit.

The flow of the primary air out of the chamber 112 induces movement of the secondary air up and into the active chilled beam 110 in the direction of arrow A. The secondary air is forced upward through an induction grill 120 before entering an induced air plenum 122 within the chamber 112. The induced air plenum 122 is provided with a sterilization means, such as an ultra violet (UV) light bulb 124 that creates an irradiate cavity 126, which functions to sterilize the secondary air as it passes through the irradiate cavity 126. In an embodiment, the UV light bulb 124 is secured to the end walls of the chamber 112 by a mounting bracket 128. In the preferred embodiment, the UV light bulb 124 is preferably a 540 μW/cm2, ¾" in diameter UV bulb. While the preferred embodiment utilizes an ultraviolet light bulb as a sterilization means for sterilizing the secondary air within the irradiate cavity 126, the present invention is not intended to be so limited in this regard. In particular, other sterilizing irradiate light systems/means may also be utilized within the irradiate cavity 126 to sterilize the secondary air without departing from the broader aspects of the present invention.

As further shown in FIG. 2, a reflective mirror 130, located beneath the UV bulb 124, is arcuate in shape to redirect a portion of the UV light from the UV bulb 124 upwards towards the top of the irradiate cavity 126. Importantly, the reflective mirror 130 acts to prevent direct UV light from entering the occupied area.

An ultra violet (UV) light absorbing shield 132 is positioned along the top of the irradiate cavity 126, directly above the UV light bulb 124. The UV light absorbing shield 132 is made from or coated with UV light absorbing material to aid inhibiting the escape of UV light from the chamber 112. As shown in FIG. 2, the shield 132 is preferably angled such that UV light will not be reflected directly back into the occupied space between the chilled beam 110. In combination with the reflective mirror 130, the absorbing shield 132 thus provides a safety feature by containing the UV light within the chilled beam 110.

In another embodiment, the internal shapes and surfaces of the air plenum 116, and indeed the chamber 112 as a whole, may be specifically designed using ultra violet light absorbing material and/or paint so that there is substantially no direct light leakage from the chilled beam 110 into the occupied space.

In operation, primary air from the central air handling system is supplied through the primary inlet 114 to the primary air plenum 116. The primary air is then directed through the rows of induction nozzles 118 towards the outer edges of the chamber 112 to induce movement of the sterilized, secondary air down and out of chamber 112. The movement of the sterilized, secondary air causes additional secondary air from the room to be induced to move up and into the induced air plenum 122 of the active chilled beam 110, as illustrated by the direction of arrow A. Within the irradiate cavity 126, the secondary air is sterilized and disinfected by the UV light emitted from the UV bulb 124.

The sterilized, secondary air then passes through a coil heat exchanger 134 and mixes with the primary air from the induction nozzles 118 and is forced to exit the chilled beam 110 down through discharge air slots 136 and outward away from the induction grill 120.

Figure 3:
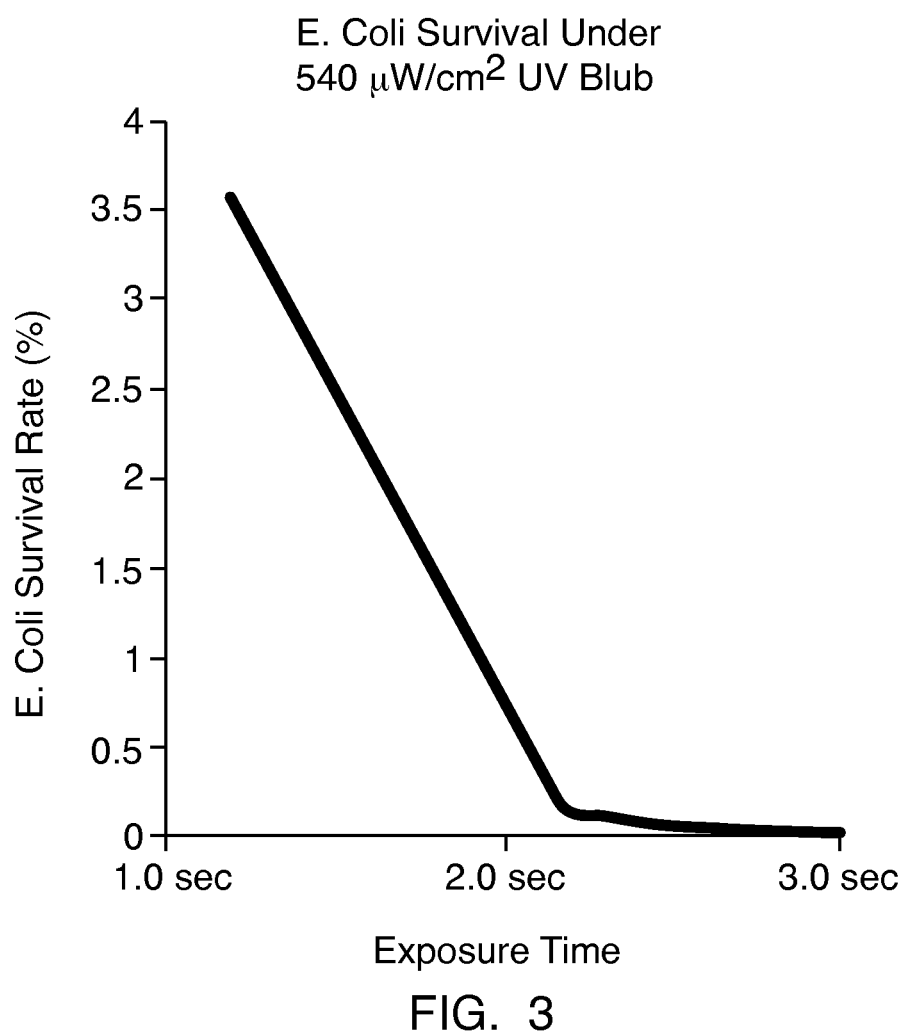
FIG. 3 is a graph illustrating E. Coli survival rate as a function of exposure time under ultra violet light.

The design of the chilled beam 110 increases the residence time of the secondary air within the irradiate cavity 126. Thus, increasing the time the particles (germs, bacteria, etc.) of the secondary air will be exposed to direct or indirect UV light emitted from the UV bulb 124. Through testing, it has been demonstrated that the induced air exposure time of the chilled beam 110 is approximately 0.64 seconds per pass, an exposure time of 3.84 seconds/hour, yielding an airborne E. Coli survival rate of 0.0014%. With reference to FIG. 3, E. Coli survival rate as a function of exposure time under UV light is shown.

As discussed above, the chilled beam 10, 110 of the present invention is an HVAC terminal device located within an occupied space and which operates on the basis of inducting room air, with or without a coil heat exchanger, to sterilize and/or disinfect the induced room air by means of a UV light bulb. As further discussed above, the reflective mirror 30, 130 and angled plate 32/UV light absorbing shield 132 within the induced air plenum 18, 118 minimizes "leakage" of the UV light from the chilled beam 10, 110 into the occupied space.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. An air handling unit for processing an air stream therethrough, comprising:
   a primary air plenum;
   a primary air inlet in fluid communication with said primary air plenum and configured to provide a flow of primary air to said primary air plenum;
   a chamber beneath said primary air plenum, said chamber including discharge channels arranged on opposed sides of said chamber and adjacent to opposed outer edges of said chamber, an irradiate cavity intermediate said opposed discharge channels, and a secondary air inlet beneath said irradiate cavity and configured to accept a flow of secondary air into said irradiate cavity in a generally upwards direction;
   a plurality of induction nozzles providing a fluid flow pathway between said primary air plenum and said discharge channels, said induction nozzles being configured to direct said primary air from said primary air plenum through said discharge channels and out of discharge ports in said channels in a generally downwards direction opposite a flow of said secondary air into said irradiate cavity;
   an ultraviolet light bulb positioned in said irradiate cavity adjacent to said secondary air inlet, said ultraviolet light bulb being configured to effectively treat and sterilize substantially only said secondary air;
   a reflective mirror beneath said ultraviolet light bulb, said reflective mirror being arcuate in shape and being configured to reflect ultraviolet light emitted from said ultraviolet light bulb upward into said irradiate cavity and away from said secondary air inlet and said discharge ports; and a shield disposed within said irradiate cavity above said ultraviolet light bulb and on an opposing side of said irradiate cavity from said ultraviolet light bulb, said shield projecting into said irradiate cavity and having a first angled face and a second angled face joined to said first angled face at an apex, said apex being positioned directly above said ultraviolet light bulb;

wherein said shield is being configured to prevent ultraviolet light from exiting said air handling unit and entering an occupied space below said air handling unit.

2. The air handling unit according to claim 1, further comprising:

an induction grill positioned in said secondary air inlet; and an induced air plenum intermediate said induction grill and said irradiate cavity, said induction grill and said induced air plenum facilitating said flow of secondary air to said irradiate cavity.

3. The air handling unit according to claim 1, wherein:
said ultraviolet light bulb is positioned within said induced air plenum.

4. The air handling unit according to claim 1, wherein:
said shield is manufactured from an ultraviolet light absorbing material.

5. The air handling unit according to claim 1, wherein:
said shield is coated with an ultraviolet light absorbing paint.

6. The air handling unit according to claim 1, further comprising:

a heat coil exchanger positioned within said chamber intermediate said discharge channels and said irradiate cavity, said coil heat exchanger being configured to accept a flow of sterilized, secondary air therethrough from said irradiate cavity for passage to said discharge channels for mixing with said primary air in said discharged channels.

7. An air handling system, comprising:

a primary air plenum configured to receive a flow of primary air;

a chamber beneath said primary air plenum having opposed induction channels adjacent to opposed outer edges of said chamber, said induction channels being in fluid communication with said primary air plenum and an outlet port formed in said chamber, an irradiate cavity intermediate said opposed induction channels, and a secondary air inlet beneath said irradiate cavity and configured to accept a generally upward flow of secondary air into said irradiate cavity;

a sterilization unit disposed in a lower portion of said irradiate cavity;

a coil heat exchanger positioned on opposing sides of said irradiate cavity between said irradiate cavity and said induction channels;

wherein said induction channels are configured to direct a flow of primary air from said primary air plenum to said outlet port in a generally downward direction to induce said generally upward flow of secondary air into said irradiate cavity;

wherein said sterilization unit is configured to effectively treat and sterilize substantially only said secondary air within said irradiate cavity; and wherein said coil heat exchanger is configured to accept a flow of sterilized secondary air from said irradiate cavity for passage to said induction channels for mixing of said sterilized secondary air with said primary air in said induction channels.

8. The air handling system according to claim 7, further comprising:

a plurality of induction nozzles configured to direct said primary air from said primary air plenum through said induction channels to said outlet port.

9. The air-handling system according to claim 7, further comprising:

an induced air plenum intermediate said secondary air inlet and said irradiate cavity, said induced air plenum facilitating said flow of secondary air into said irradiate cavity.

10. The air-handling system according to claim 8, wherein:
said sterilization unit is an ultraviolet light bulb.

11. The air-handling system according to claim 10, further comprising:

a reflective mirror adjacent to said ultraviolet light bulb, said reflective mirror being arcuate in shape and being configured to reflect ultraviolet light emitted from said ultraviolet light bulb upward into said irradiate cavity and away from said secondary air inlet and said outlet port.

12. The air-handling system according to claim 11, further comprising:

an angled shield disposed above said ultraviolet light bulb in an upper portion of said irradiate cavity, said shield projecting into said irradiate cavity and having a first angled face and a second angled face joined to said first angled face at an apex, said apex being positioned directly above said ultraviolet light bulb;

wherein said angled shield is configured to prevent ultraviolet light from exiting said chamber.

13. The air-handling system according to claim 12, wherein:
said angled shield is configured to absorb ultraviolet light.

14. A method of processing a stream of air in an air handling unit, said method comprising the steps of:

initiating a flow of primary air into said air handling unit;

inducing a flow of secondary air into a cavity within said unit by directing a flow of said primary air out of a lower portion of said air handling unit;

sterilizing substantially only said secondary air within said cavity by exposing said secondary air within said cavity to ultraviolet light; and preventing said ultraviolet light from escaping said air handling unit by reflecting said ultraviolet light away from said lower portion of said air handling unit and away from openings in said air handling unit.

* * * * *